United States Patent
Curry

(10) Patent No.: US 7,613,950 B2
(45) Date of Patent: Nov. 3, 2009

(54) DETECTING FLOATING POINT HARDWARE FAILURES

(75) Inventor: John W. Curry, Union City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 494 days.

(21) Appl. No.: 10/789,733

(22) Filed: Feb. 27, 2004

(65) Prior Publication Data
US 2005/0204194 A1 Sep. 15, 2005

(51) Int. Cl.
*G06F 11/00* (2006.01)
(52) U.S. Cl. .......................... 714/28; 703/14
(58) Field of Classification Search .............. 714/28, 714/27
See application file for complete search history.

(56) References Cited

U.S. PATENT DOCUMENTS

| | | | | |
|---|---|---|---|---|
| 5,067,069 A * | 11/1991 | Fite et al. | 712/218 |
| 5,481,719 A * | 1/1996 | Ackerman et al. | 718/108 |
| 5,560,035 A * | 9/1996 | Garg et al. | 712/23 |
| 5,606,696 A * | 2/1997 | Ackerman et al. | 718/108 |
| 5,651,125 A * | 7/1997 | Witt et al. | 712/218 |
| 5,845,064 A * | 12/1998 | Huggins | 714/33 |
| 5,852,726 A * | 12/1998 | Lin et al. | 712/200 |
| 5,859,962 A * | 1/1999 | Tipon et al. | 714/33 |
| 5,884,057 A * | 3/1999 | Blomgren et al. | 712/204 |
| 5,951,696 A * | 9/1999 | Naaseh et al. | 714/34 |
| 5,951,704 A * | 9/1999 | Sauer et al. | 714/736 |
| 6,021,484 A * | 2/2000 | Park | 712/41 |
| 6,101,501 A * | 8/2000 | Breslau et al. | 707/103 R |
| 6,223,272 B1 * | 4/2001 | Coehlo et al. | 712/1 |
| 6,332,201 B1 * | 12/2001 | Chin et al. | 714/28 |
| 6,434,741 B1 * | 8/2002 | Mirani et al. | 717/124 |
| 6,539,503 B1 * | 3/2003 | Walker | 714/703 |
| 6,542,862 B1 * | 4/2003 | Safford et al. | 703/26 |
| 6,564,162 B1 * | 5/2003 | Erskine | 702/120 |
| 6,625,759 B1 * | 9/2003 | Petsinger et al. | 714/28 |
| 6,643,800 B1 * | 11/2003 | Safford et al. | 714/35 |
| 6,751,725 B2 * | 6/2004 | Bistry et al. | 712/221 |
| 7,047,394 B1 * | 5/2006 | Van Dyke et al. | 712/209 |
| 7,107,490 B2 * | 9/2006 | Eisenhoffer et al. | 714/30 |
| 7,139,936 B2 * | 11/2006 | Petsinger et al. | 714/28 |
| 2003/0005365 A1 * | 1/2003 | Wilson | 714/38 |
| 2003/0126503 A1 * | 7/2003 | Eisenhoffer et al. | 714/30 |
| 2004/0039966 A1 * | 2/2004 | Petsinger et al. | 714/28 |
| 2004/0158600 A1 * | 8/2004 | Markstein et al. | 708/497 |
| 2004/0210798 A1 * | 10/2004 | Higashi | 714/27 |

* cited by examiner

*Primary Examiner*—Robert Beausoliel
*Assistant Examiner*—Elmira Mehrmanesh

(57) ABSTRACT

A method for testing floating point hardware in a processor while executing a computer program is disclosed. The method includes executing a first set of code of the computer program without employing the floating point hardware. The first set of code has a first floating point operation, thereby obtaining an emulated result. The method also includes executing the first floating point instruction utilizing the floating point hardware, thereby obtaining a hardware-generated result. The method also includes comparing the emulated result with the hardware-generated result.

27 Claims, 5 Drawing Sheets

DETECTING FLOATING POINT HARDWARE FAILURES

BACKGROUND OF THE INVENTION

Floating point operations are generally performed by specialized floating point hardware in the processor (CPU). If the floating point hardware is defective, however, floating point errors may lead to data corruption, and may not be detected for some time. Further, some floating point errors may be intermittent, and may be undetectable using standard diagnostic methods.

In the prior art, there exist different diagnostic methods for detecting floating point hardware failure. One method involves running diagnostic test applications from time to time. The execution result is then compared against the expected result. Floating point hardware failure is detected when there are differences in the results. One main problem with this diagnostic method is that a diagnostic test application, no matter how well designed, cannot exactly duplicate the floating point vectors produced by the user's application (s) and/or the kernel under real world circumstances. This is because the computer manufacturer cannot possibly predict and account for all possible types of user applications that may be developed for a given computer system. Accordingly, this diagnostic method may fail to detect floating point hardware failure for certain user applications.

Lockstep hardware represents another approach to detecting floating point hardware failure. The lockstep approach may involve, for example, having 2 processors run in a "lock step" fashion. In the lock step approach, the result from each CPU is compared with the other to ensure that they agree. If one CPU has an errant floating point unit, the comparison will fail and floating point hardware can thus be detected. However, the lockstep hardware approach is expensive as it involves hardware duplication. Furthermore, if both processors have identical problems (e.g., due to a defective design), the results produced will be identical, albeit erroneous, for certain floating point operations. In this case, the floating point hardware failure is not detectable using the lockstep hardware approach.

SUMMARY OF INVENTION

The invention relates, in an embodiment, to a method for testing floating point hardware in a processor while executing a computer program. The method includes executing a first set of code of the computer program without employing the floating point hardware. The first set of code has a first floating point instruction, thereby obtaining an emulated result. The method also includes executing the first floating point instruction utilizing the floating point hardware, thereby obtaining a hardware-generated result. The method also includes comparing the emulated result with the hardware-generated result.

In another embodiment, the invention relates to a method for detecting failure in floating point hardware of a processor while executing a computer program. There is included entering a diagnostic mode, which includes executing a first floating point operation of the computer program by emulating the floating point operation with a set of non-floating point operations, thereby obtaining an emulated result. The entering the diagnostic test also includes executing the first floating point operation utilizing the floating point hardware, thereby obtaining a hardware-generated result. There is also included comparing the emulated result with the hardware-generated result to detect the failure to detect the failure. There is further included determining whether diagnostic mode is to be continued and resuming execution of the computer program in a non-diagnostic mode if the diagnostic mode is to be discontinued. The non-diagnostic mode involves performing floating point operations of the computer program without emulating with non-floating point operations.

In another embodiment, the invention relates to an article of manufacture that includes a program storage medium having computer readable code embodied therein. The computer readable code is configured to test floating point hardware in a processor while executing a computer program. The article of manufacture includes computer readable code for executing a first set of code of the computer program without employing the floating point hardware, the first set of code having a first floating point operation, thereby obtaining an emulated result. There is included computer readable code for executing the first floating point instruction utilizing the floating point hardware, thereby obtaining a hardware-generated result. There is also included computer readable code for comparing the emulated result with the hardware-generated result.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF DETAILED EMBODIMENTS

Figure 1:
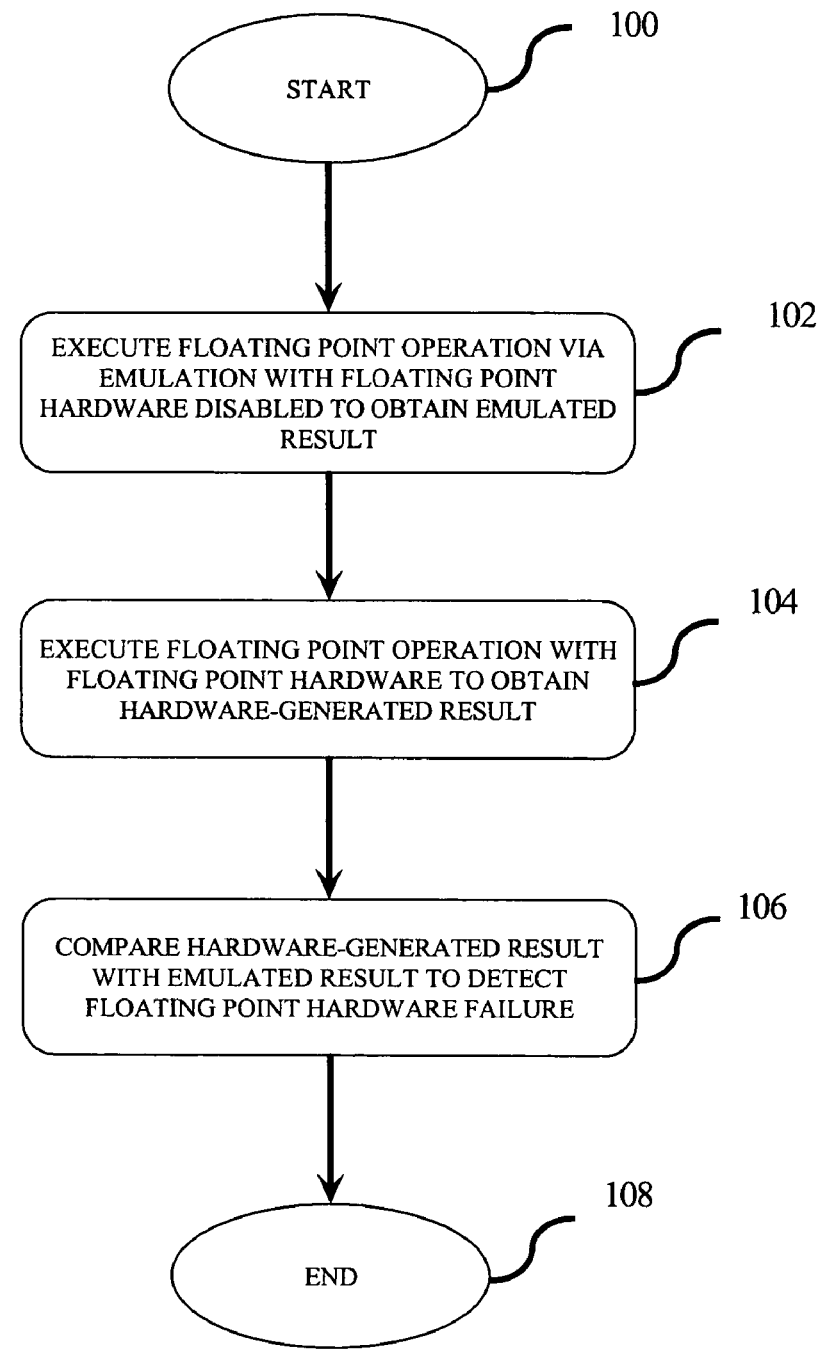
FIG. 1 illustrates, in accordance with an embodiment of the present invention, the steps for automatically detecting floating point hardware failure.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with embodiments of the invention, there is provided a method for automatically and efficiently detecting floating point hardware failures. In an embodiment, there is provided a diagnostic routine which causes the CPU to enter the diagnostic mode in order to perform diagnostic tests for floating point hardware failure using floating point vectors from the field application. The diagnostic test may be performed on a periodic interval or at random times or an a predetermined schedule. As the term is employed herein, a field application is an application that runs on the computer system during normal usage. For example, if the computer system is employed by an insurance agency, the field application may be the application that manages the insurance contracts for that insurance agency. As another example, if the computer system is employed by an artist to manipulate digital pictures, the field application may be the application employed by that artist to perform the digital image manipulation.

At any time during the execution of a field application, the diagnostic mode may be entered. In the diagnostic mode, the floating point hardware is effectively turned off and the field application is forced to execute as if the CPU does not have floating point hardware. Any subsequent floating point operation in the field application is emulated by non-floating point operations employing non-floating point hardware logics (such as integer logics), and the emulated result is obtained.

After some time, the floating point hardware is again turned on, and the same code section that includes the floating point operation(s) executed earlier via emulation is re-executed with the now-activated floating point hardware. The result is computed with the floating point hardware activated is obtained and compared with the emulated result obtained earlier. A difference in the results indicates a problem with the floating point hardware, allowing corrective actions to be taken.

Since embodiments of the inventive diagnostic method employ floating point operations and vectors from the field application, the earlier discussed disadvantages associated with using factory-supplied diagnostic tests are avoided. Diagnostic testing of the floating point hardware can now be performed on the fly using the customer's floating point vectors. Further, there is no need to employ expensive, redundant hardware (such as that required in the prior art lockstep approach) in order to detect floating point hardware failure. The modifications to obtain both an emulation result and a floating point hardware-generated result involve only fairly minor software modification, which is both inexpensive and quick to implement.

Although the need to execute some floating point operations twice (i.e., once via emulation and once via the activated floating point hardware) may result in some performance degradation, the performance penalty can be substantially reduced by running in the diagnostic mode for only a short time duration, by increasing the time interval between diagnostic executions and/or by choosing a time when the computer system is lightly used to run diagnostic.

The features and advantages of the present invention may be better understood with reference to the figures and discussions that follow. FIG. 1 illustrates, in accordance with an embodiment of the present invention, the steps for automatically detecting floating point hardware failure. In step 102, a floating point operation of a computer program is executed by emulating the floating point operation with non-floating point operations (such as integer operations, for example), thereby generating an emulated result. In an embodiment, step 102 is accomplished by turning off the floating point hardware and executing the floating point operation with the processor, thereby causing the kernel to emulate the floating point hardware with non-floating point operations. In step 104, the floating point hardware is turned on, and the floating point operation is executed again utilizing the floating point hardware, thereby obtaining a hardware-generated result. In step 106, the emulated result is compared against the hardware-generated result. If the result differs, a possible floating point hardware failure is indicated.

Figure 2:
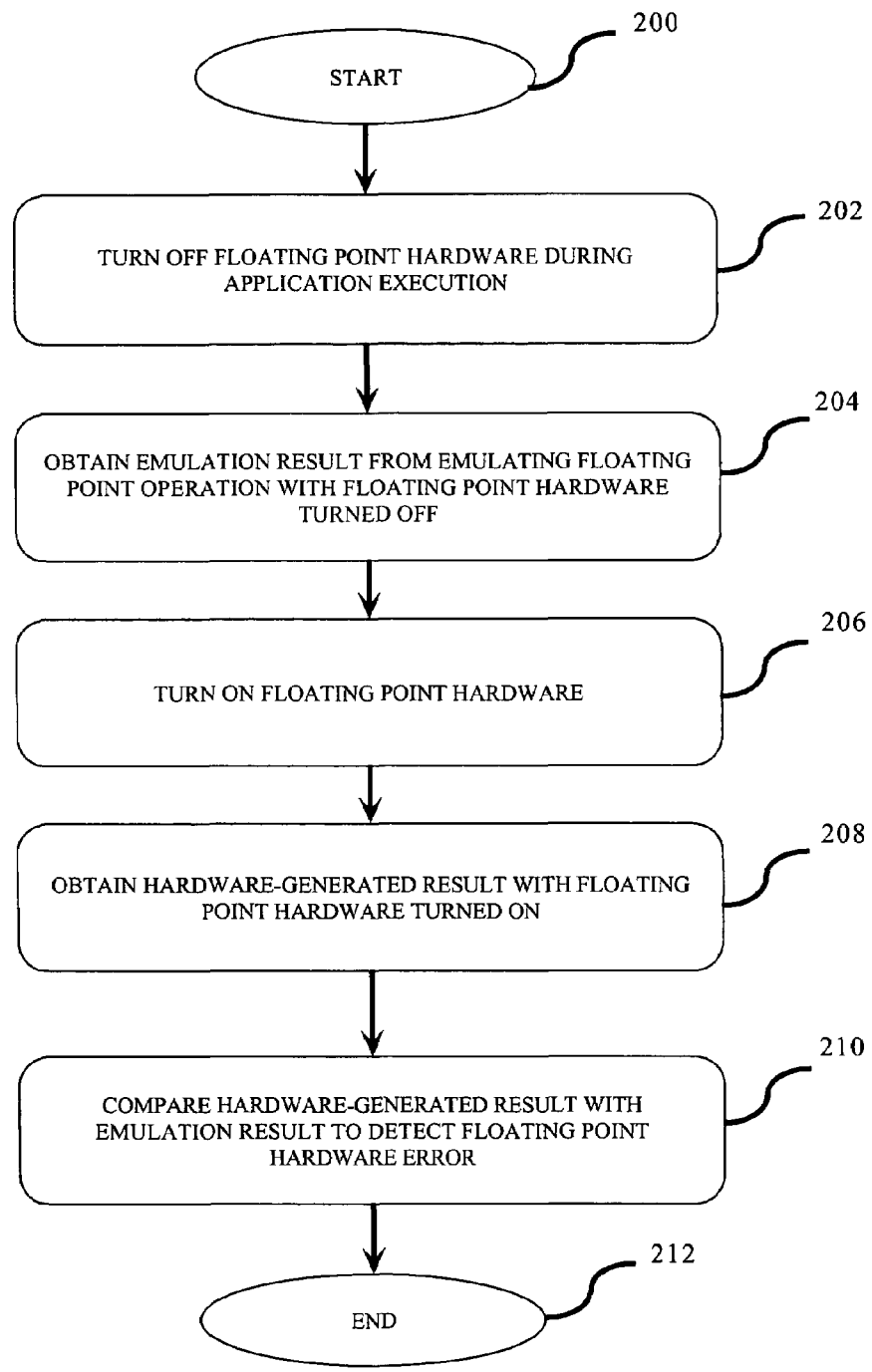
FIG. 2 illustrates, in accordance with another embodiment of the present invention, the steps for automatically detecting floating point hardware failure.

FIG. 2 illustrates, in accordance with another embodiment of the present invention, the steps for automatically detecting floating point hardware failure. In step 202, the floating point hardware is turned off during the execution of a field application. In certain processors, the floating point logics may be turned off by, for example, programming certain registers with specific values. In PA-RISC™ 3.0 (available from the Hewlett-Packard Company of Palo Alto, Calif.), for example, the floating point hardware may be turned off by clearing the CR10 co-processor control register (CCR). In the Itanium™ family of processors (available from Intel Corporation of Santa Clara, Calif.), for example, the floating point hardware may be turned off by setting the DFL and DFH bits in the processor status register (PSR).

With the floating point hardware turned off, the operating system will cause any subsequent floating point operation to execute in the floating point emulation mode. Typically, this emulation is performed by using integer logics to perform integer operations, which emulate floating point operations and provide an emulated result.

In step 204, the emulation result is obtained from executing the floating point operations in the emulation mode. In step 206, the floating point hardware is turned on again. In step 208, the same section of code that was executed in the floating point emulation mode is executed again, except with the floating point hardware executed. This subsequent execution provides a floating point hardware-generated result, which is then compared with the emulation result in step 210.

If the two results agree, there is no error. On the other hand, if the two results differ, a floating point hardware error may exist, and corrective actions may be initiated.

Figure 3:
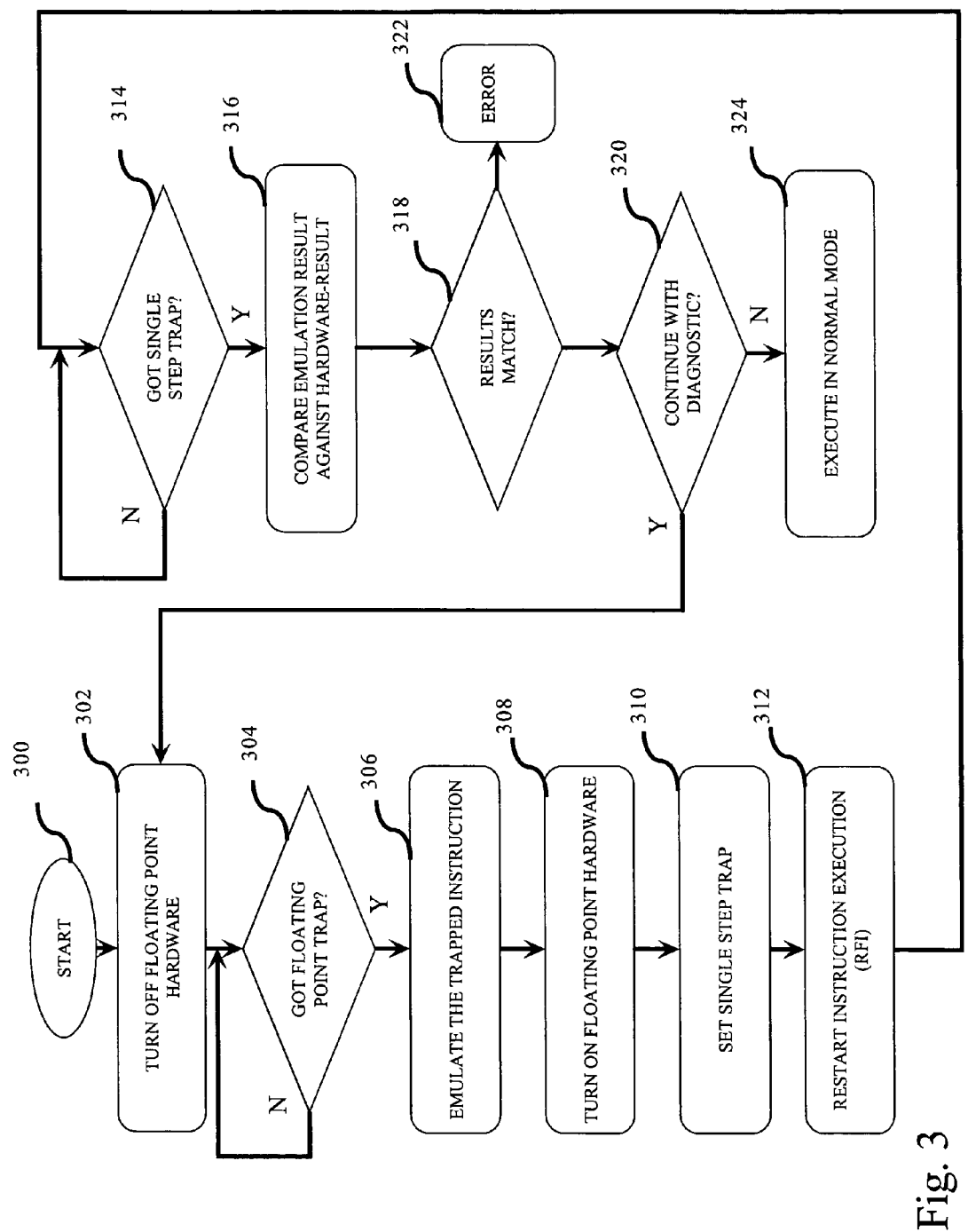
FIG. 3 illustrates, in accordance with another embodiment of the invention, the steps for automatically detecting floating point hardware failure by modifying the kernel software.

FIG. 3 illustrates, in accordance with another embodiment of the invention, the steps for automatically detecting floating point hardware failure by modifying the kernel software. In step 302, the floating point hardware is turned off by the kernel while the field application is executing. In step 304, the floating point trap, which is generated by the CPU, is detected. A floating point trap is encountered when a floating point operation is encountered but there is no floating point hardware available. Once the floating point trap is detected, the kernel emulates the trapped instruction (206) using non-floating point operations (e.g., integer arithmetic) to allow the floating point operation in the trapped instruction to be executed by emulation.

In step 308, the floating point hardware is turned back on. In step 310, a single step trap is set in order to trap the result after one instruction is executed. This allows the kernel to obtain the floating point hardware generated result when the instruction executed earlier under emulation (in step 306) is subsequently re-executed with the floating point hardware turned on. This re-execution of the earlier trapped instruction with the floating point hardware turned on is performed in step 312.

In step 314, the single step trap is detected. In an embodiment, the floating point register employed in the re-execution may be ascertained from the opcode of the trap message, and the floating point hardware-generated result can be obtained from such register. In step 316, the emulation result is compared with the floating point hardware-generated result. If the results match (as ascertained in step 318), the method proceeds to step 320 to ascertain whether diagnostic is to be continued. If not (as determined in step 320), the field application may continue to operate as normal, i.e., without disabling floating point hardware to obtain emulated results for floating point operations. On the other hand, if continued diagnostic is desired, the method returns to step 302 to continue operating in the diagnostic mode.

On the other hand, if the comparison between the emulation result and the floating point hardware-generated result does not reveal a match, a floating point hardware problem may exist (322), and corrective actions may be taken.

Figure 4:
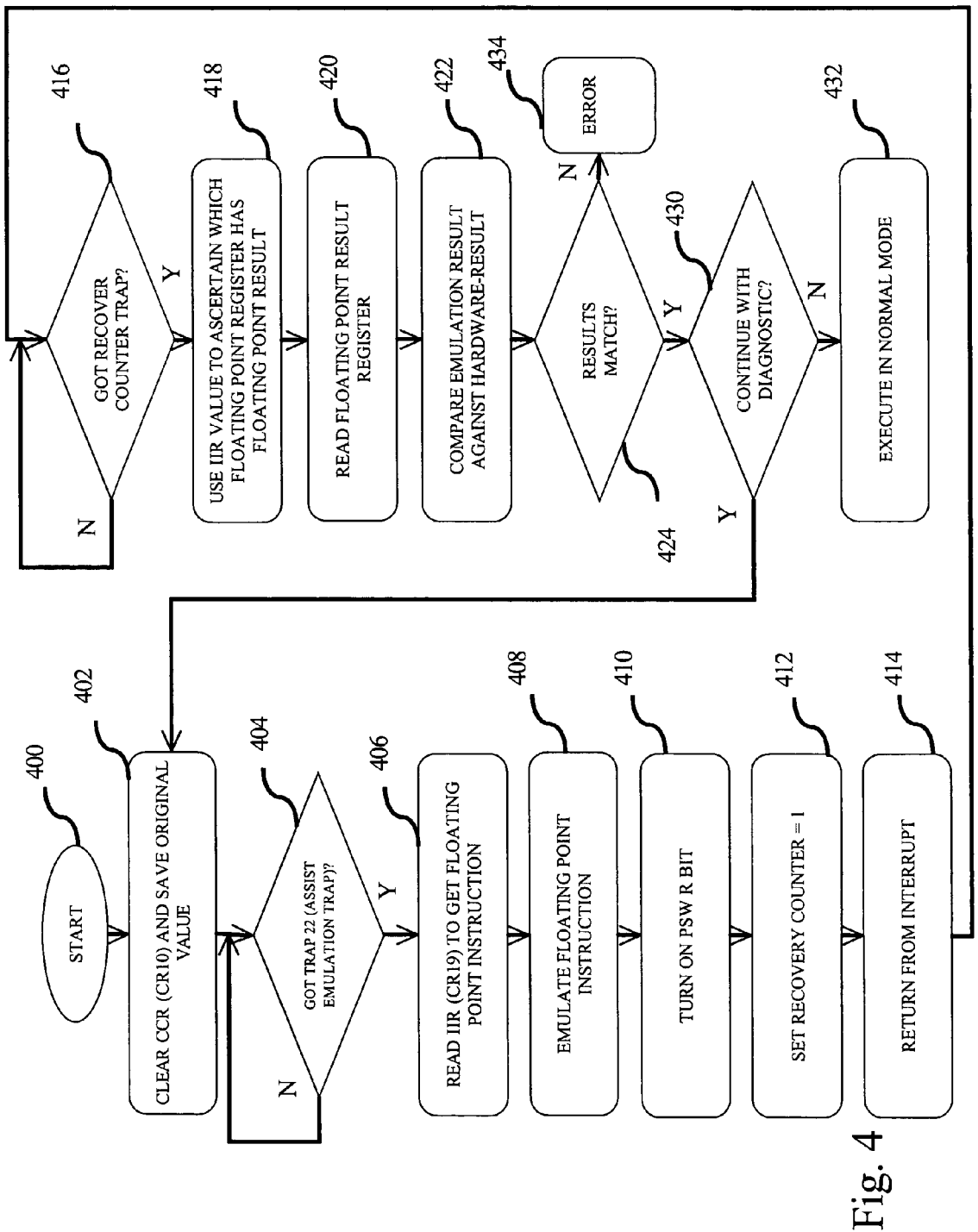
FIG. 4 shows, in accordance with an embodiment of the invention, the steps for automatically detecting floating point hardware failure for a computer system utilizing one or more PA-RISC™ 2.0 processors.

FIG. 4 shows, in accordance with an embodiment of the invention, the steps for automatically detecting floating point hardware failure for a computer system utilizing one or more PA-RISC™ 2.0 processors. In step 402, the floating point hardware is turned off by the kernel while the field application is executing. In the PA-RISC™ architecture, this is accomplished by clearing the CR10 co-processor control register. Subsequently, the attempt to execute a floating point instruction results in an assist emulation trap, which is trap 22 in PA-RISC™ (step 404). If the assist emulation trap is detected in step 404, the method proceeds to step 406 wherein the CR19 Interrupt Instruction Register is read to obtain the opcode of the trapped instruction in order to ascertain both the type of floating point instruction being attempted and the target register for such floating point instruction.

In step 408, the floating point instruction is emulated using non-floating point instructions, such as integer instructions. This emulation allows the emulation result to be obtained from the non-floating point hardware. In step 410, the R bit of the PSW (Processor Status Register) is turned on in order to facilitate trapping of an instruction. In step 412, the recovery counter is set to 1. In step 414, a return from interrupt (RFI) back to the floating point instruction trapped in step 404 is executed. However, since the floating point hardware is now turned back on, the execution of that floating point instruction generates a hardware-generated result, which is trapped and detected in step 416 (since the recovery counter, which was set to 1 in step 412, counts down by 1 for every instruction executed and traps when the counter reaches zero).

Once the recovery counter trap is acquired, the CR19 Interrupt Instruction Register (IIR) is read to ascertain the opcode, which indicates which floating point register contains the floating point hardware result. In step 420, the hardware floating point result is read. In step 422, the emulation result is compared with the floating point hardware-generated result. If the results match (as ascertained in step 424), the method proceeds to step 430 to ascertain whether diagnostic is to be continued. If not (as determined in step 430), the field application may continue to operate as normal (432). On the other hand, if continued diagnostic is desired, the method returns to step 402 to continue operating in the diagnostic mode.

On the other hand, if the comparison between the emulation result and the floating point hardware-generated result does not reveal a match, a floating point hardware problem may exist (434), and corrective actions may be taken.

Figure 5:
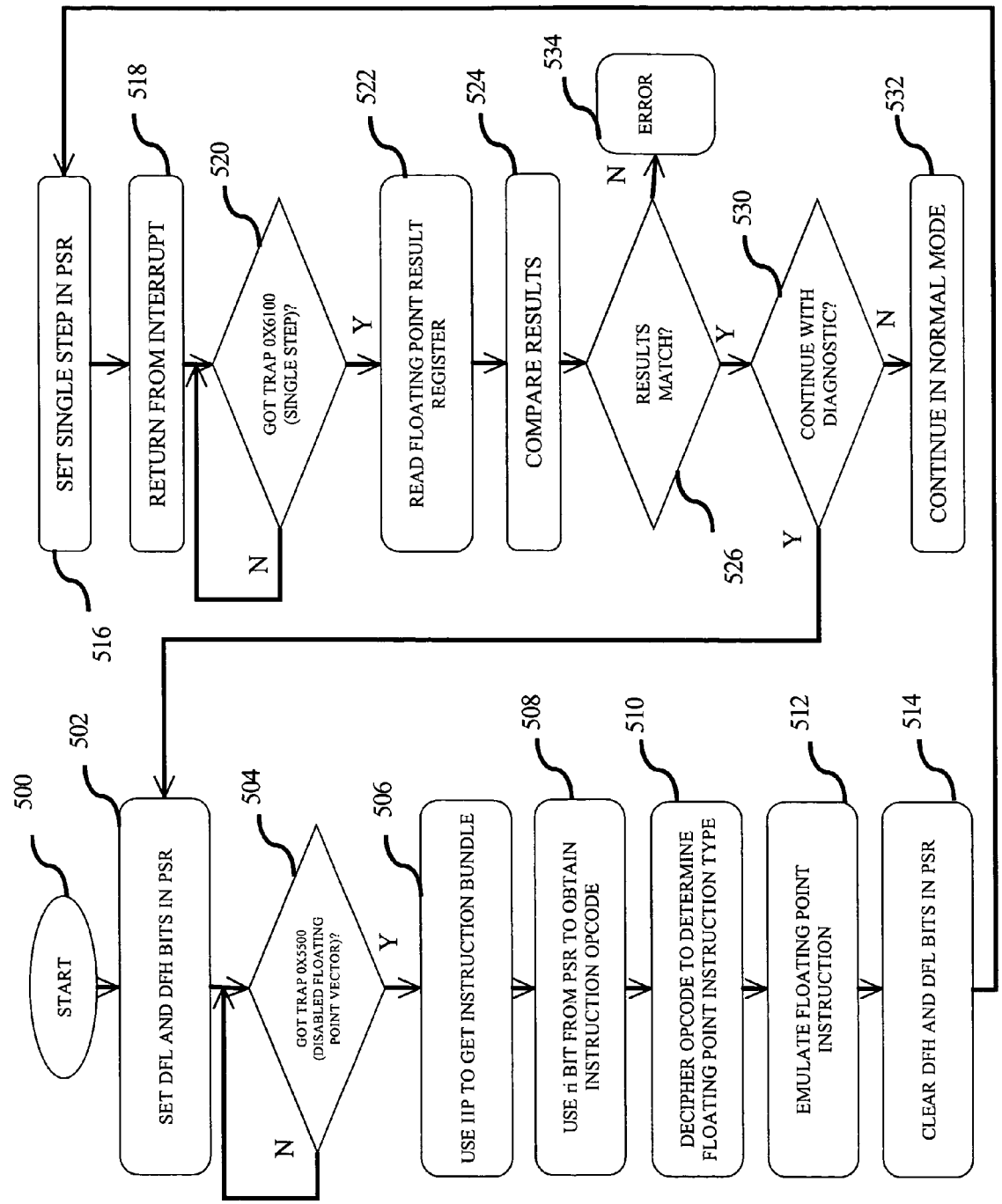
FIG. 5 shows, in accordance with an embodiment of the invention, the steps for automatically detecting floating point hardware failure for a computer system utilizing one or more processors of the Itanium™ family of processors.

FIG. 5 shows, in accordance with an embodiment of the invention, the steps for automatically detecting floating point hardware failure for a computer system utilizing one or more processors of the Itanium™ family of processors. In step 502, the floating point hardware is turned off by the kernel while the field application is executing. In the Itanium™ architecture, this is accomplished by setting the DFL (Disable Floating Point Low) and DFH (Disable Floating Point High) register sets in the Processor Status Register (PSR). Subsequently, the attempt to execute a floating point instruction results in a trap O×55000 (step 504), which represents a disabled floating point vector.

If the O×55000 trap is detected in step 504, the method proceeds to step 506 wherein the Interrupt Instruction Pointer (IIP) is employed to ascertain the bundle of instructions trapped. In step 508, the ri bit from the Processor Status Register (PSR) is employed to obtain the floating point instruction that causes the trap from the bundle of instructions identified via the IIP (in step 506). The combination of the IIP and the ri bit allows the opcode to be ascertained, which reveals the type of floating point instruction being attempted (step 510) and the target floating point register where the result is supposed to be stored.

In step 512, the floating point instruction is emulated using non-floating point instructions such as integer instructions. This emulation allows the emulation result to be obtained from non-floating point hardware. In step 514, the DFL and DFH bits are cleared in the Processor Status Register (PSR) in order to turn the floating point hardware back on.

In step 516, the single step mode bit (ss bit) in the PSR is set in order to enable trapping after a single instruction is executed. In step 518, a return from interrupt (RFI) is effected to re-execute the floating point instruction trapped earlier in step 504. However, since the floating point hardware is now turned back on, the execution of that floating point hardware generates a hardware-generated result, which is trapped and detected in step 520 (via the detection of trap O×6100). Once the O×6100 trap is detected, the floating point hardware result is read (step 522) from the target register ascertained earlier from the opcode in step 510.

In step 524, the emulation result is compared with the floating point hardware-generated result. If the results match (as ascertained in step 526), the method proceeds to step 530 to ascertain whether diagnostic is to be continued. If not (as determined in step 530), the field application may continue to operate as normal (532). On the other hand, if continued diagnostic is desired, the method returns to step 502 to continue operating in the diagnostic mode.

On the other hand, if the comparison between the emulation result and the floating point hardware-generated result does not reveal a match (as ascertained in step 524), a floating point hardware problem may exist (534), and corrective actions may be taken.

While this invention has been described in terms of several embodiments, there are alterations, permutations, and equivalents which fall within the scope of this invention. For example, although the examples discussed obtaining the emulated result first, it is possible to obtain the hardware-generated result before obtaining the emulated result. Further, although PA-RISC™ and Itanium™ family of processors are employed to facilitate discussion, the invention applies to any processor having the ability to turn off the floating point hardware. Additionally, although the examples discuss the methods for floating point hardware failure detection, it should be understood that the invention encompasses computer systems for performing such methods as well as computer readable medium (such as chip-based memory or magnetic-based memory or optical memory) storing computer readable codes implementing such methods. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for testing floating point hardware in a processor while executing a computer program, comprising:

executing a first set of code of said computer program without employing said floating point hardware, said first set of code having a first floating point instruction, thereby obtaining an emulated result;

executing said first floating point instruction utilizing said floating point hardware, thereby obtaining a hardware-generated result; and comparing said emulated result with said hardware-generated result.

2. The method of claim 1 further comprising rendering said floating point hardware unavailable prior to said executing said first set of code of said computer program without employing said floating point hardware.

3. The method of claim 2 wherein said processor represents an Itanium™ processor, said rendering said floating point hardware unavailable including setting at least one of a DFH and a DEL bit in a processor status register of said processor.

4. The method of claim 2 wherein said processor represents a PA-RISC™ processor, said rendering said floating point hardware unavailable including clearing a CR10 co-processor control register of said processor.

5. The method of claim 2 wherein said rendering said floating point hardware unavailable includes writing a first predefined value into a register in said processor.

6. The method of claim 5 further comprising rendering said floating point hardware available for executing instructions of said computer program prior to said executing said first floating point instruction utilizing said floating point hardware.

7. The method of claim 6 wherein said rendering said hardware available includes writing a second predefined value into said register in said processor.

8. The method of claim 7 wherein said processor represents an Itanium™ processor, said rendering said floating point hardware available including clearing at least one of a DFH and a DEL bit in a processor status register of said processor.

9. The method of claim 7 wherein said processor represents a PA-RISC™ processor, said rendering said floating point hardware available including setting a CR10 co-processor control register of said processor.

10. The method of claim 1 wherein said obtaining said hardware-generated result includes obtaining a trap result after said first floating point instruction is executed utilizing said floating point hardware.

11. The method of claim 1 wherein said obtaining said emulated result includes obtaining a hardware-generated trap result after said processor encounters said first floating point instruction while said floating point hardware is unavailable.

12. The method of claim 1 wherein said computer program represents a field application program.

13. A method for detecting failure in floating point hardware of a processor while executing a computer program, comprising:

entering a diagnostic mode, including
  executing a first floating point operation of said computer program by emulating said floating point operation with a set of non-floating point operations, thereby obtaining an emulated result,
  executing said first floating point operation utilizing said floating point hardware, thereby obtaining a hardware-generated result, and
  comparing said emulated result with said hardware-generated result to detect said failure to detect said failure;
determining whether diagnostic mode is to be continued; and
resuming execution of said computer program in a non-diagnostic mode if said diagnostic mode is to be discontinued, said non-diagnostic mode involving performing floating point operations of said computer program without emulating with non-floating point operations.

14. The method of claim 13 said entering said diagnostic mode further comprising rendering said floating point hardware unavailable prior to said executing said first floating point operation by said emulating.

15. The method of claim 14 wherein said processor represents an Itanium™ processor, said rendering said floating point hardware unavailable including setting at least one of a DFH and a DEL bit in a processor status register of said processor.

16. The method of claim 14 wherein said processor represents a PA-RISC™ processor, said rendering said floating point hardware unavailable including clearing a CR10 co-processor control register of said processor.

17. The method of claim 14 wherein said rendering said floating point hardware unavailable includes writing a first predefined value into a register in said processor.

18. The method of claim 17 wherein said entering said diagnostic mode further including rendering said floating point hardware available for executing instructions of said computer program prior to said executing said first floating point operation utilizing said floating point hardware.

19. The method of claim 18 wherein said rendering said hardware available includes writing a second predefined value into said register in said processor.

20. The method of claim 19 wherein said processor represents an Itanium™ processor, said rendering said floating point hardware available including clearing at least one of a DFH and a DFL bit in a processor status register of said processor.

21. The method of claim 19 wherein said processor represents a PA-RISC™ processor, said rendering said floating point hardware available including setting a CR10 co-processor control register of said processor.

22. The method of claim 13 wherein said obtaining said hardware-generated result includes obtaining a trap after said first floating point operation is executed utilizing said floating point hardware.

23. An article of manufacture comprising a program storage medium having computer readable code embodied therein, said computer readable code being configured to test floating point hardware in a processor while executing a computer program, comprising:

computer readable code for executing a first set of code of said computer program without employing said floating point hardware, said first set of code having a first floating point instruction, thereby obtaining an emulated result;

computer readable code for executing said first floating point instruction utilizing said floating point hardware, thereby obtaining a hardware-generated result; and computer readable code for comparing said emulated result with said hardware-generated result.

24. The article of manufacture of claim 23 further comprising computer readable code for rendering said floating point hardware unavailable prior to said executing said first set of code of said computer program without employing said floating point hardware.

25. The article of manufacture of claim 24 wherein said computer readable code for rendering said floating point hardware unavailable includes computer readable code for writing a first predefined value into a register in said processor.

26. The article of manufacture of claim 25 further comprising computer readable code for rendering said floating point hardware available for executing instructions of said computer program prior to said executing said first floating point instruction utilizing said floating point hardware.

27. The article of manufacture of claim 26 wherein said computer readable code for rendering said hardware available includes computer readable code for writing a second predefined value into said register in said processor.

* * * * *

UNITED STATES PATENT AND TRADEMARK OFFICE
CERTIFICATE OF CORRECTION

PATENT NO. : 7,613,950 B2  Page 1 of 1
APPLICATION NO. : 10/789733
DATED : November 3, 2009
INVENTOR(S) : John W. Curry It is certified that error appears in the above-identified patent and that said Letters Patent is hereby corrected as shown below:

In column 7, line 15, in Claim 3, delete "DEL" and insert -- DFL --, therefor.

In column 7, line 33, in Claim 8, delete "DEL" and insert -- DFL --, therefor.

In column 8, line 10, in Claim 15, delete "DEL" and insert -- DFL --, therefor.

Signed and Sealed this

Thirteenth Day of April, 2010

David J. Kappos
*Director of the United States Patent and Trademark Office*